July 21, 1931.      C. L. JONES      1,815,570
HEAT TRANSFER APPARATUS
Original Filed Aug. 7, 1928

INVENTOR
Charles L. Jones

Patented July 21, 1931

1,815,570

UNITED STATES PATENT OFFICE

CHARLES L. JONES, OF PELHAM, NEW YORK

HEAT TRANSFER APPARATUS

Original application filed August 7, 1928, Serial No. 297,953. Divided and this application filed April 7, 1930. Serial No. 442,153.

This invention relates generally to heat transfer apparatus, and more particularly to such an apparatus in which a bed of permeable metal composed of metallic particles bonded together, so as to have high heat conductivity, is employed.

This application is a division of my copending application, Serial No. 297,953, filed August 7, 1928, which relates to permeable metal and the method of making the same. The present invention is directed to heat transfer apparatus, in which such a bed of permeable metal is employed.

Figure 1:
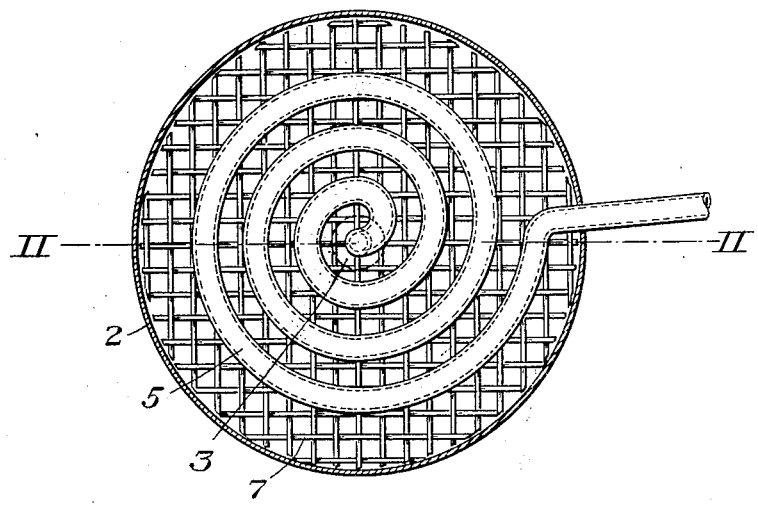
Figure 2:
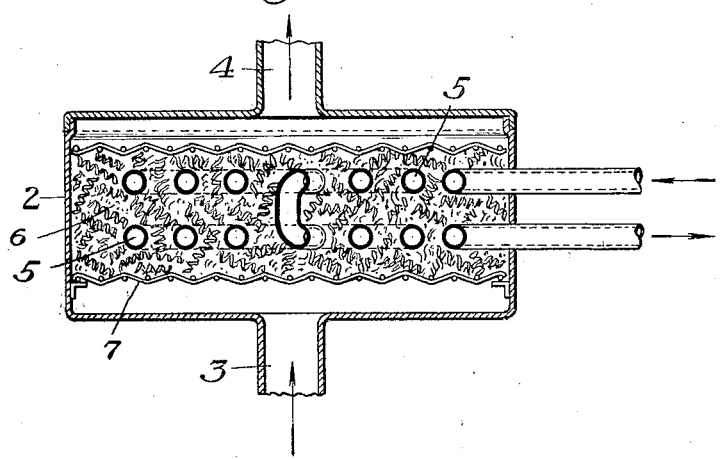

In the drawings, which illustrate the present preferred embodiment of a heat transfer apparatus, including a bed of permeable metal made in accordance with my invention, Figure 1 is a plan view of the heat exchange apparatus, and Figure 2 is a section taken on the line II—II of Figure 1.

Heretofore metallic chips, turnings, or borings have been used in the heat exchange art as beds for transferring heat in heat exchange apparatus. Such an apparatus is described in the United States Patent to Best No. 485,526. Although a bed such as is described in the patent is suitable in certain instances, such beds may not be successfully employed where it is necessary to transfer heat very rapidly. This is due to the fact that in a bed composed of metallic chips, turnings or borings, such as is described in the patent, the chips are not bonded together in order to form continuous heat conducting surfaces. The voids between the metallic particles prevent the rapid transfer of heat.

In accordance with my invention, I provide a permeable metal composed of metallic particles bonded together so that the permeable metal presents continuous heat transferring surfaces which rapidly conduct heat to or from one medium to another. In such a heat transfer the heat is transferred substantially entirely by conduction, whereas in the beds of metallic chips, such as described in the patent to Best, the heat is transferred from particle to particle through air spaces by convection.

In forming a permeable metallic bed in accordance with my invention, in order to provide continuous heat transferring surfaces, I may proceed as follows:

A vessel is filled with clean metallic particles, such as copper turnings or borings, and the particles are heated. A small quantity of any suitable soldering flux is then added to the particles and thereafter molten solder is introduced into the container, thereby filling up the voids between the metallic particles and bonding the particles together. The excess solder is then drained off, leaving a bed of metallic particles bonded together by the solder. In order to increase the permeability of the bed thus produced, compressed air or other fluid is blown through the hot mass to remove any excess solder which was not eliminated by draining the solder from the metallic particles. By this means the permeability of the resultant bed may be controlled. This method provides a permeable bed or mass of metallic particles having continuous metallic connection throughout and in which heat can flow by conduction without encountering surface resistances between the particles.

It will be apparent that although in the above preferred example I have used copper turnings as the metallic particles and solder as the metal for bonding the particles together in order to provide continuous heat transferring surfaces, any metal having good heat conducting properties may be employed in place of the copper particles and any suitable metal can be employed in place of the solder in order to join the particles together. It also will be apparent that instead of employing copper particles, other metal particles or particles comprising alloys may be used, and in place of the solder, any metal or mixture of metals of a lower fusing point than the fusing point of the metallic particles may be employed to bond the particles together. By the term "metal" it is intended to include not only metals in the technical sense, but alloys and mixtures of metals as well.

For many purposes it is desirable to produce a permeable bed which is resistant to high temperatures. In producing such a bed, metals of high melting point must be employed and it becomes increasingly difficult to produce the desired structure by melting one of the constituents in order to form a binding medium for the other constituent. In such cases, it is desirable to electroplate the particles which form the permeable bed with a metal such as nickel, chromium, or other suitable metal. In carrying out the electroplating step the methods now commonly employed in the electroplating art are followed, except that in order to uniformly plate the particles, they are first compressed to form a mass having good electrical conductivity, and this mass instead of being introduced into the electrolyte between the two electrodes, preferably is itself used as the cathode. The electrolyte is forced through the mass of compressed particles, thereby plating the particles and bonding them together so as to provide continuous heat transferring surfaces. In the electroplating process every precaution should be taken to insure that the mass of metallic particles is sufficiently compressed before immersing it in the electrolyte so as to make good electrical connection between the particles in order that the entire mass of compressed metallic particles will assume the proper potential throughout its mass.

Instead of mixing molten metal with metallic particles and then draining off the excess molten metal, I might, if desired, coat the metallic particles by dipping them in a molten metal, such as solder, having a lower fusing point than the fusing point of the metallic particles, in order to coat them. The coated particles are then tumbled either in a wire basket or a perforated tumbling drum while they cool. The resultant coated particles are then compressed into any desired shape, and the entire compressed mass is subjected to heat in order to soften the coating of the metallic particles and to join the particles together.

Another method of providing a permeable metallic bed is to mix the particles with a fine powder of a metal having a lower melting point than the melting point of the particles. The mixture is then compressed to form the desired mass and thereafter is heated in order to melt the powder and to bond the particles together.

In some cases it is desirable to orient the particles which make up the permeable metal. For example, in a heat exchange apparatus provided with tubes or other means for conveying fluid through the apparatus, and a bed of permeable metal, it is desirable to have the contact of the permeable bed exceptionally good at the surfaces of the tubes. This may be accomplished by subjecting the metallic particles which form the bed to the action of a magnetic field of the desired intensity and direction in order to orient the particles, and thereafter proceeding in accordance with any of the methods above described in order to bond the particles together.

In the drawings I have illustrated in a somewhat diagrammatic manner a heat exchange device employing a permeable metallic bed in accordance with my invention. The heat exchange device comprises a shell 2 having a conduit 3 arranged in the bottom of the shell for introducing a cooling fluid, and having a conduit 4 at the top of the shell through which the cooling fluid leaves the heat exchanger. A coiled tube 5 through which the fluid to be cooled is passed, is arranged within the shell 2 and embedded in a permeable bed 6 comprising metallic particles bonded together. The bed 6 is supported within the shell 10 by a wire frame 7.

In the apparatus above described, the liquid to be cooled flows in through the upper end of the coiled tube 5, is cooled by the fluid flowing upwardly through the heat exchanger and then flows out through the lower end of the coiled tube. The cooling fluid enters the heat exchanger through the inlet 3 and after flowing through the permeable bed 6 leaves the heat exchanger through the outlet 4.

I have illustrated and described the present preferred form of my invention, but it should be understood that it may be modified within the scope of the following claims:

I claim as my invention:

1. A heat transfer apparatus comprising a bed of permeable metal composed of metallic particles bonded together, and a conduit for fluid embedded therein.

2. A heat transfer apparatus comprising a bed of permeable metal composed of metallic particles bonded together by metal, and a conduit for fluid embedded therein.

3. A heat transfer apparatus comprising a bed of permeable metal composed of metallic particles bonded together by metal of lower melting point than the particles, and a conduit for fluid embedded therein.

4. A heat transfer apparatus comprising a bed of permeable metal composed of copper particles bonded together by solder, and a conduit for fluid-embedded therein.

5. A heat transfer apparatus comprising a bed of permeable metal composed of metallic particles bonded together, and a conduit for fluid embedded therein, the metallic particles being oriented to increase their contact with the conduit.

6. A heat transfer apparatus comprising a bed of permeable metal composed of metallic particles having high conductivity bonded together by a metal of relatively low melting point, and a conduit for fluid embedded therein, the metallic particles being oriented to increase their contact with the conduit.

7. A heat transfer apparatus comprising a shell, a bed of permeable metal composed of metallic particles bonded together inside the shell, a conduit for fluid embedded in said bed, and means for passing a fluid through the bed to change the temperature of the fluid in the conduit.

8. A heat transfer apparatus comprising a shell having a fluid inlet and outlet, a bed of permeable metal composed of metallic particles bonded together within the shell and between said inlet and outlet, and a conduit for fluid embedded in said bed.

In testimony whereof I have hereunto set my hand.

CHARLES L. JONES.